US010803110B2

(12) United States Patent
Shaw

(10) Patent No.: US 10,803,110 B2
(45) Date of Patent: Oct. 13, 2020

(54) RECOMMENDATION LISTS FOR CONTENT DELIVERY SYSTEM

(71) Applicant: PIKSEL, INC., Wilmington, DE (US)

(72) Inventor: Philip Shaw, Yorkshire (GB)

(73) Assignee: PIKSEL, INC., Wilmington, DE (US)

( * ) Notice: Subject to any disclaimer, the term of this patent is extended or adjusted under 35 U.S.C. 154(b) by 293 days.

(21) Appl. No.: 15/523,108

(22) PCT Filed: Oct. 29, 2015

(86) PCT No.: PCT/EP2015/075161
§ 371 (c)(1),
(2) Date: Apr. 28, 2017

(87) PCT Pub. No.: WO2016/066762
PCT Pub. Date: May 6, 2016

(65) Prior Publication Data
US 2017/0316000 A1    Nov. 2, 2017

(30) Foreign Application Priority Data

Oct. 31, 2014    (GB) .................................. 1419488.0

(51) Int. Cl.
*G06F 16/00* (2019.01)
*G06F 16/435* (2019.01)
(Continued)

(52) U.S. Cl.
CPC ...... *G06F 16/435* (2019.01); *G06F 16/24578* (2019.01); *G06F 16/68* (2019.01);
(Continued)

(58) Field of Classification Search
CPC ............. G06F 16/435; G06F 16/24578; G06F 16/9535; G06F 16/68; H04N 21/4668; G06Q 30/0631
See application file for complete search history.

(56) References Cited

U.S. PATENT DOCUMENTS 8,311,948 B1 * 11/2012 Lu ........................... G06Q 50/01
705/319
8,984,098 B1 * 3/2015 Tomkins ................. G06F 12/06
709/219
(Continued)

OTHER PUBLICATIONS

Blanco-Fernandez, et al, *Incentivized provision of metadata, semantic reasoning and time-driven filtering; Making a puzzle of personalized e-commerce*, Expert Systems With Applications, Oxford, GB, Jan. 1, 2010.

(Continued)

*Primary Examiner* — Leslie Wong
(74) *Attorney, Agent, or Firm* — Holzer Patel Drennan

(57) ABSTRACT

A computer device for providing recommendations to a user device associated with a user, the computer device comprising: a controller for maintaining an asset list, configured to receive notification of a new asset, and in dependence thereon to: determine if the asset is perishable; and in dependence on the asset being perishable: update the asset list to include the perishable asset; allocate a weighting to the perishable asset; and adjust the weighting of the perishable asset based on its perishability over time.

14 Claims, 4 Drawing Sheets

(51) Int. Cl.

| | |
|---|---|
| *G06F 16/9535* | (2019.01) |
| *G06F 16/2457* | (2019.01) |
| *G06Q 30/06* | (2012.01) |
| *G06Q 50/00* | (2012.01) |
| *G06Q 30/02* | (2012.01) |
| *G06F 16/68* | (2019.01) |
| *H04N 21/466* | (2011.01) |

(52) U.S. Cl.
CPC ..... *G06F 16/9535* (2019.01); *G06Q 30/0282* (2013.01); *G06Q 30/0631* (2013.01); *G06Q 50/01* (2013.01); *H04N 21/4668* (2013.01)

(56) References Cited

U.S. PATENT DOCUMENTS

| | | | | |
|---|---|---|---|---|
| 2005/0071741 | A1* | 3/2005 | Acharya | G06Q 30/0246 715/208 |
| 2007/0118498 | A1* | 5/2007 | Song | G06Q 30/0633 |
| 2010/0251305 | A1* | 9/2010 | Kimble | H04N 7/17318 725/46 |
| 2012/0303792 | A1 | 11/2012 | Sathish | |
| 2013/0254308 | A1* | 9/2013 | Rose | H04N 21/252 709/206 |
| 2014/0136554 | A1* | 5/2014 | Moradi | G06F 16/435 707/754 |
| 2014/0164093 | A1* | 6/2014 | Libman | G06Q 30/0277 705/14.39 |
| 2014/0280231 | A1* | 9/2014 | Paruchuri | G06F 16/162 707/749 |
| 2014/0280554 | A1* | 9/2014 | Webb | H04L 67/22 709/204 |
| 2014/0358847 | A1* | 12/2014 | Rahurkar | G06F 16/328 707/609 |
| 2015/0112918 | A1* | 4/2015 | Zheng | G06Q 30/02 706/48 |
| 2016/0212484 | A1* | 7/2016 | Kimble | H04N 7/17318 |
| 2017/0235838 | A1* | 8/2017 | Shaw | G06F 16/9535 707/706 |
| 2017/0316000 | A1* | 11/2017 | Shaw | H04N 21/4668 |

OTHER PUBLICATIONS

International Search Report and Written Opinion, dated Jan. 12, 2016, European Patent Office.

* cited by examiner

RECOMMENDATION LISTS FOR CONTENT DELIVERY SYSTEM

CROSS REFERENCE TO RELATED APPLICATIONS

This application has a claim to priority based on 'Time Based Asset List Controller', GB Patent Application No. 1419488.0 (PWF Ref. 338130 GB) filed 31 Oct. 2014.

BACKGROUND TO THE INVENTION

Field of the Invention

The invention relates to a content delivery system. The invention is particularly concerned with controlling the recommendations to a user.

Description of the Related Art

Content delivery systems are known which provide recommendations to a user about content they may wish to consume.

Most recommendation systems have an asset list that changes slowly over time. The asset list holds a list of asset identifiers which identify assets that can be recommended. Since the process of updating the indexes upon which recommendation algorithms depend is a computationally intensive task, updates are often made in batches at pre-set time intervals to minimise the consequential downtime or period of sub-optimal performance.

Some systems may also offer the option to update indexes when a sufficiently large number of new items are being added or when an especially important set of items must be made available.

In any case, the focus of existing systems is on infrequent updates.

Most systems allow assets' availability to recommendation algorithms to be limited in a number of ways: some users of the recommendation system may not be shown certain collections of assets which are not part of their subscription plan, or for which rights are not held for distribution in their region. Moreover, assets may have availability windows within which, or outside of which, different sets or rights or availabilities are offered.

This last case is of greatest use with catch-up content. A programme shown on a linear TV channel may then be made available on catch-up for seven days. Such an item would therefore be present in the recommendation system's asset list accompanied by a seven-day availability window. During this time the system may recommend this item to users; after the period expires it would not.

Availability windows provide recommendation systems with additional parameters to use in their matching algorithms, in the same way that regional availability qualifiers work.

Assets with expired availability windows may be removed from the system at a later stage, but while the records remain in the asset list the system will continue to review them for inclusion in recommendation lists. Moreover, the removal of assets from the list, like the addition of new ones, involves a period of index recalculations.

SUMMARY OF THE INVENTION

In one aspect there is provided a computer device for providing recommendations to a user device associated with a user, the computer device comprising: a controller for maintaining an asset list, configured to receive notification of a new asset, and in dependence thereon to: determine if the asset is perishable; and in dependence on the asset being perishable: update the asset list to include the perishable asset; allocate a weighting to the perishable asset; and adjust the weighting of the perishable asset based on its perishability over time.

The perishable asset is associated with a time period, wherein the weighting of the perishable asset is adjusted on expiry of the time period. The weighting is decreased on expiry of the time period.

The perishable asset is removed from the asset list on expiry of the time limit.

A level of activity associated with the asset is monitored, wherein the weighting of the perishable asset is adjusted in dependence on the level of activity. The weighting is decreased in dependence of a level on activity being below a threshold. The weighting is increased in dependence on a level of activity being above a threshold. The perishable asset is removed from the asset list if the level of activity is below a threshold.

A recommendation is dependent on the weighting allocated to an asset.

A recommendation system may include the computer system.

In another aspect there is also provided a corresponding method comprising a method for providing recommendations to a user device associated with a user, the method comprising: maintaining an asset list; receiving notification of a new asset, and in dependence thereon: determining if the asset is perishable; and in dependence on the asset being perishable: updating the asset list to include the perishable asset; allocating a weighting to the perishable asset; and adjusting the weighting of the perishable asset based on its perishability over time.

According to an example, there is provided a content delivery system for delivering content to a user, the system comprising: an asset list identifying assets to be delivered to a user, wherein the assets comprise persistent assets and perishable assets; a recommendation component configured to receive user-related data and to deliver recommendations of assets selected from the list to be consumed by the user; a list controller configured to receive asset data identifying new assets, the asset data including a time of generation of the new asset to compare the time of generation of perishable assets with the current time to determine the time lapsed between the time of generation of the asset and the current time and an asset flag which denotes if an asset is perishable or persistent and to selectively add perishable assets to the list and remove perishable assets from the list based on the time lapse since the time of generation of the perishable asset.

The flag which allows each asset to be described as perishable or not can denote what the "freshness" period is, and include a property that indicates whether this period is known/fixed or just an estimate which would be subject to further analysis.

The described embodiments allow for the concept of "staleness" to be introduced into a recommendation engine.

The present application incorporates by reference all subject matter included in the following applications, which are identified by their official application number and the short title given to them to denote their subject matter as an internal designation:

U.S. 62/033,520—"Navigational Paradigm"
U.S. 62/033,445—"Context Driven Content"

U.S. 62/033,448—"Eco System"
U.S. 62/033,471—"Sequence of Delivery"
U.S. 62/033,473—"Swipe Based Volume Control"
GB 1416052.7—"Wearables"

The cases listed above are referred to herein as the "Context-Based Recommendation" applications. Content display and delivery systems exist to provide users of computer devices with information and entertainment. Content comprises a large number of different kinds of presentation materials, including images and text. Content includes dynamic media such as weather and news updates, social media such as Twitter and Facebook, information such as email and entertainment such as video (both Video on Demand VOD and Linear (broadcast channel LC)). It is increasingly problematic for a user to efficiently and successfully navigate their way through this vast proliferation of content to receive and view only that which is relevant to him. This is wasteful of a user's time and network resources, as well as local processing and storage resources. The recommendation cases listed above describe a content delivery system in which a content delivery server is configured to select from multiple content items a set of content items for display to a user at a user terminal, the content delivery server having access to content identifiers, identifying content items for delivery, the content delivery server comprising: a processor operating a content selection program which is arranged to receive the context data for different contexts and to select a set of content items in dependence on the context data, wherein the content items in the set can vary with the context data, such that the content of items in a first set for a user in a first context could be different from the content of items in a second set for the same user in a second context, and to transmit a recommendation message to a user terminal comprising a set of content identifiers.

Thus, according to this set of cases, it is generally disclosed that the context of a user can be used to enhance recommendations.

The "context-based recommendation" applications listed above allow the context of a user to be used to enhance recommendations. Thus, the user-related data can be context data for a user as defined in the context-based recommendation applications and/or in the application U.S. Ser. No. 14/530,435 entitled: "Context Vector" (filed under Page White & Farrer's reference 337510US).

Additionally or alternatively, the user-related data can include profile data of a user which identifies aspects and characteristics of the user to inform recommendations. The user-related data can comprise a combination of user profile data and context data.

With the increasing wealth of content that could potentially be recommended to a user, it is useful to introduce the concept of "staleness" or conversely "freshness" to an asset list which governs the assets from which a recommendation component can select. Described embodiments address this.

One component of "staleness" is that an asset could be provided to an asset list too late after it has been generated. A news article for example, may only have relevance within a short amount of time (minutes or hours) after it has been created. Thus, it needs to be added to the asset list within a certain time of the time of generation of the asset.

Another component of "staleness" is that after an asset has been placed on an asset list and is available for recommendation, it may quickly cease to be fresh and therefore should be removed.

Breaking news articles which flourish into genuinely new news topics may enter the system within an estimated freshness period but which may be lengthened if the story proves popular or ongoing. YouTube clips, or those from similar sites, may also be short-lived particularly if they are one of number of similar clips in the lifecycle of a meme. The meme remains topical but the clips in them go stale. Live action replays would have a very short shelf-life, perhaps no more than an hour or so in some cases.

Therefore, two components are provided, one is to ensure that new assets are added to a list within a certain time of the time of generation of the asset. If they are not available to be added to the list within that time, then they are not added to the list at all.

Additionally, according to examples of the invention in a second component assets marked as "perishable" with a fixed freshness period are removed from the list when a certain period of time has expired since the time of generation of the asset. This period of time varies with the nature of the asset. For example, an asset of high topical relevance, such as a news article, may remain on the asset list for a very short time only (minutes or hours), whereas a live asset such as a YouTube clip or broadcast programme may remain on the asset list for a longer period of time such as a week, depending on whether it is linear or catch-up.

Removal of an asset from the asset list has the consequence that the asset is no longer available for recommendation.

The recommendation component can form part of a recommendation engine which is provided by a processor executing suitable code sequences. The list controller can also form part of the same recommendation engine, or it can be a separate element of the system which is connected to the recommendation component and/or the recommendation engine.

In the present application, a "new" asset is one which is newly generated (released or emerged), "perishable" means it has some time-limited relevance. The following are useful definitions:

Live—an event that is happening currently

Linear—a sequence of programming played out, one item after the other, in their stated order, A linear schedule may include some programmes that are live, others that are repeated/delayed content (e.g. live shows shown on the +channel) or pre-recorded (e.g. Friends Season 1 Episode 4; The Voice, etc. . . . )

New—an item of content not previously known to the system

Catch-up—an item of content from a linear channel that is available to watch again for a limited period after its airing On-Demand—an item of content that may or may not have been shown on a linear channel but which is available to watch whenever the user wishes For example, an asset could be a programme that has been shown on a linear television channel. This could be a live televised event, or a programme that is airing on a TV channel at the current time. The time of generation of the new asset could be the time of the actual event in the case that a live event is being shown, or it could be the time of creation of the television programme (that is, its broadcast time). Note that broadcast programmes may have two appropriate time points. The first is when the programme is aired for the first time, and the second is a period of time within which the programme is available in a "catch-up" service.

Another example of perishable assets are new items being added to YouTube or other similar providers (Vimeo/Flickr, etc.), in the same way as new items become available on television schedules.

In fact, it is these kind of clips that can suffer most from the effects of diminishing relevance with age.

Another form of perishable assets are news articles which can be individual articles added to a content source of news, or in the form of a news stream.

Other assets are streamed, for example, Facebook feeds and Twitter feeds.

One use of the present invention is to provide recommendations to users who are using their own computer devices so that a user can review recommendations and decide what type of content to view at any particular time and context.

Another use of the system described herein is to create a personalised channel in which persistent and live assets can be intermixed in a scheduled manner. This is described in more detail in the case entitled: "Personalised Channel", U.S. Ser. No. 62/073,785 (under Page White & Farrer reference 338126 GB), the contents of which are herein incorporated by reference.

BRIEF DESCRIPTION OF THE DRAWINGS

Reference is made by way of example to.

DESCRIPTION OF PREFERRED EMBODIMENT

Figure 1:
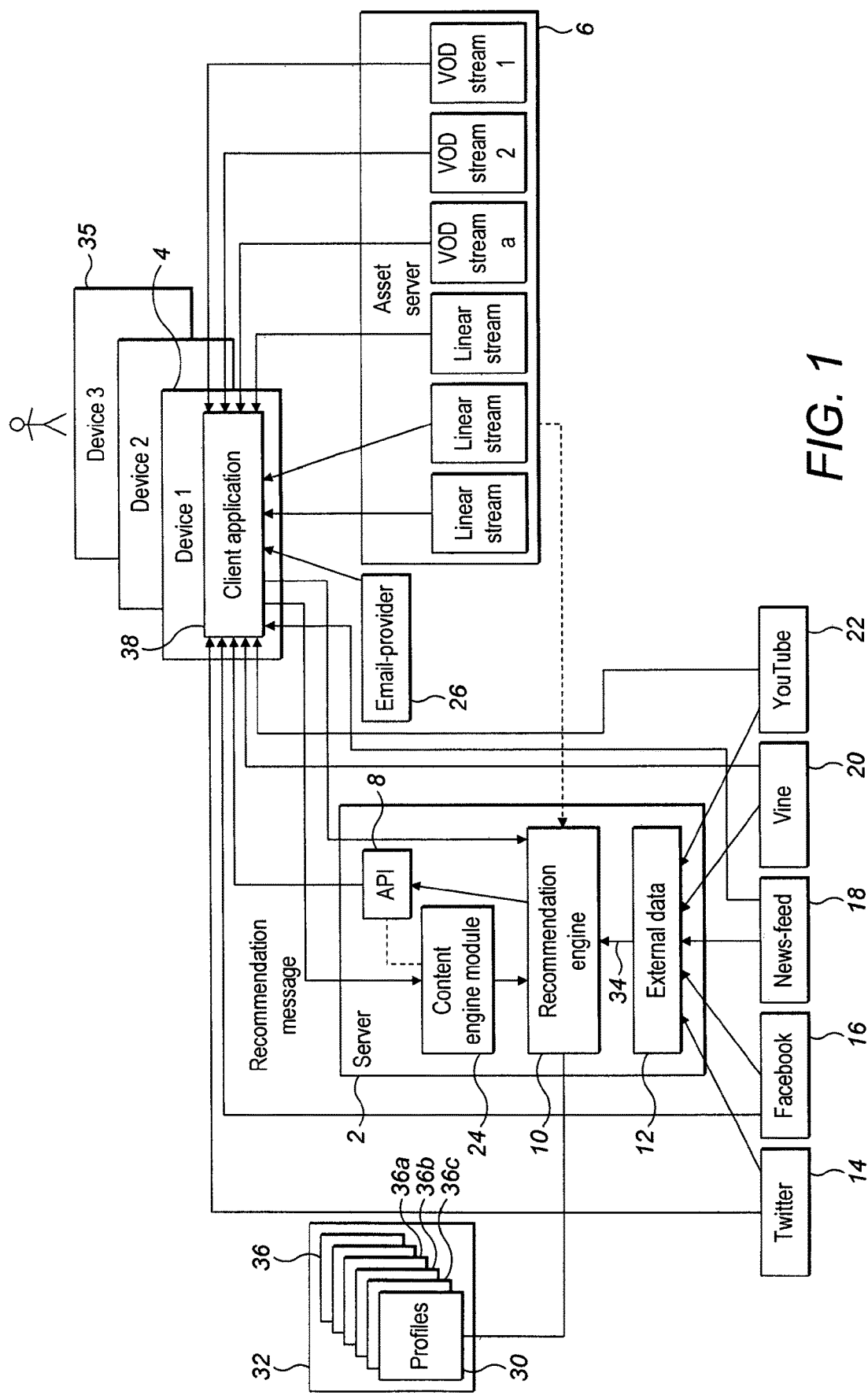
FIG. 1 is a drawing of the architecture of a content delivery system.

An asset list controller is described here, which works somewhat differently than known controllers, and aims to solve the following issues:

new content may be added in real-time removing content is as easy as adding it assessment of content staleness is used to evaluate content for automatic removal While the focus for most known recommendation systems is on infrequent batch updates, the asset list controller described here can be used to provide existing recommendation algorithms with frequent, incremental updates. Thus, it can use a type of index which can be incrementally changed rather than entirely recalculated to allow for continual change without degrading programme. For example, a blend of sparse and dense indexes can be used, based on the mongoDB which offers the ability to incrementally patch an index without degrading performance for large data sets.

The system operates using a new concept of perishable content.

Perishable content has a finite lifetime; or at best a useful lifetime beyond which it is sufficiently irrelevant as to be considered finite.

Content in this category might include live replays of goals; key moments in debates; trailers for shows airing later; breaking news articles; teasers and so on. Indeed, content may be made available to a recommendation system which was not initially considered perishable but which needs to become so because of a rights violation or inappropriate subject matter (of particular importance in user-generated content scenarios such as YouTube).

Perishable content may only be suggested by a recommendation system while it is still fresh. Beyond its lifetime the content may no longer be recommended and should be removed from the asset list.

It is preferable to remove it from the list, rather than adjust its availability window, because in a system where lots of new content is being added often (e.g. YouTube content, news articles, etc. . . . ) it is important to allow the matching algorithms to be as efficient as possible. Removing content which they cannot return in their result-sets therefore makes sense.

The existing practice of using availability windows for catch-up content would still be appropriate if the content might get another such window later or if it might be shown again on a linear TV channel. However for content that has a single lifetime, a single window of availability, it should be considered perishable.

Most current recommendation systems are unable to offer suggestions that include fresh content that perishes quickly because of the way in which they update their indexes as described above—the content having aged beyond its usefulness before the index has been updated, or being stale enough when it does hit the indexes to be of little value to users.

An asset list controller (ALC) which is able to deliver and recommend content that has a sort shelf-life is therefore both novel and valuable.

For some content types such as live action replays, the lifetime of the item can be estimated at the outset and provided to the ALC so that it can remove it at the appropriate time. However, for others such as news stories, while the content is undoubtedly perishable it is not clear when it will become stale.

Consider an example.

Firefighters are responding to reports of a woodland fire. It is important to get this story into the system and pushed to users in the area almost immediately.

While the fire will certainly be put out, when the story breaks it is unclear when this will happen.

As it turns out, the reported fire is a false alarm. There is no fire. The story is immediately stale and it is not desirable for the system to continue pushing the story to nearby users.

The ALC calculates staleness of perishable content even when it enters the system with an open-ended lifetime (freshness period not known).

News stories, like the one in this example, attract attention quickly from the general public. Links to stories will be share on. Facebook, retweeted on Twitter, and comments will be left on the story's website.

The level of activity (LoA) expressed in an item is a guide to its continued freshness. When the LoA drops below a given threshold after an initial grace period, it can be considered stale and therefore ripe for removal from the list.

The initial grace period gives an item time to attract attention otherwise a new item with no shares/likes/retweets would immediately be purged. As such, any open-ended lifetime perishable would enter the system with a minimum lifetime value.

Note the LoA assessment is based on publicly available information and is not predicated on our system's audience interacting with the story. Twitter, Facebook, YouTube, Vine, and most content commenting systems have open APIs that allow the necessary metrics to be measured readily.

FIG. 1 is a schematic architecture of a high level design of a content delivery system. A control server 2 is connected to a user terminal 4 by any suitable communication network, whether wired or wireless. The network is not shown in FIG. 1 for reasons of clarity. The user terminal 4 is also in communication with an asset server 6 via a same or different network. The asset server supplies video assets which can be linear stream assets or VOD assets. The user terminal 4 requests assets from the asset server 6 based on information which it receives from the control server 2. The control server 2 comprises an API (for example a REST API) 8, a recommendation engine 10, data aggregator 12 and a context engine module 24. The recommendation engine data aggregator and context engine module are all implemented by a suitably programmed processor or processors (not shown). The data aggregator is connected to a number of sources external to the control server 2, again by any suitable communication network. In this example, these sources comprise a Twitter feed 14 and a Facebook feed 16 (referred to herein as social media sources which generate social media updates), a newsfeed 18, a Vine feed 20 and a YouTube feed 22. These are exemplary only and it will readily be appreciated that other sources may be appropriate. The control server has access to user profiles 30, either in a local memory (not shown) or in a storage facility 32 accessible to the server. The data aggregator 12 receives information from these multiple sources and monitors their content so as to be able to supply content based information 34 to the recommendation engine 10. The recommendation engine 10 operates based on the content-based information supplied by the data aggregator 12 and user profile data to recommend content items to a consumer at a user terminal. The content items can be video assets which can be accessed at the asset server 6 or content from the sources themselves. Thus the recommendation engine 10 has information about all assets available in the asset server 6 and operates to recommend assets based on the content-based information 34 it receives from the external data aggregator 12.

The user terminal 4 is labelled "Device 1". A user 35 may own multiple devices, which are indicated in FIG. 1 by the labelling Device 2, Device 3. Each of these devices is a user terminal. For example, a user 35 might own a tablet, a smartphone, and a laptop and a TV set. He may be using one or more devices at any particular time. In one particular use case mentioned later, he may for example, be using a smartphone (Device 1) and a TV set (Device 2), with the smartphone acting as a companion to the TV set. In any event, all the devices are capable of communicating with the server when they are active and logged on by the user. In FIG. 1, connections are shown between the user terminal 4 and the server 2. In particular, the user terminal 4 feeds data back to the context engine 24 and the recommendation engine 10. In addition, the devices can communicate with the asset server to obtain assets from the asset server.

In some embodiments, the system is capable of delivering content recommendations based on the type of device that a user is currently logged in to.

The user 35 has a profile 36 in the user profile 30. In this user profile are stored preferences and other information about the user 35 to allow recommendations to be made based on information personal to that user. In the present system, the user can set up individual sub-profiles, 36a, 36b, 36c, etc. which allow him to have different preferences in different situations that he may find himself in. This means that recommendations based on the user sub-profiles cold vary even for the same user when that user is in different settings. It will readily be appreciated that a single user is being discussed, but in practice the system operates with a large number of different users, where all users have profiles and sub-profiles set up for them respectively. Only a single profile and its sub-profiles is shown in FIG. 1 for the sake of convenience.

In addition to providing recommendations based on device type, the system provides recommendations based on other context parameters, as described in the "Context Based Recommendation" applications incorporated herein by reference, and in the sister case filed on even date with this case with the short title "Context Vector"; PWF Ref: 335710US, claiming priority from U.S. 62/033,445.

As described in our co-pending case entitled: "Social Trends" filed under PWF reference 338127US, and incorporated herein by reference the recommendation engine may include decision logic which uses social updates from similar users (that is, users sharing at least one predetermined characteristic with the current consuming user) to make an assessment of what the user might like, rather than looking at social media as a whole. To achieve this, in one embodiment, the recommendation engine is configured to recognise identifiers of originating sources within the social media feeds, whereby the identifiers indicate the characteristics of the originators. It will be evident that each social medial feed comes from a particular originator, and that originator is associated with an identifier. The identifier can include information about the characteristics of the originator.

The recommendation engine can check if the originator shares at least one predetermined characteristic with the current consuming user (for example, by checking the profile data of the user) before allowing that particular update to influence the content recommendation.

In another embodiment, a filtering component in the recommendation engine filters out from a large set of social media data (for example, historic data) a set wherein the user profile characteristics of the set are similar to that of the current consuming user.

In embodiments the context engine module 24 influences the recommendation engine so that the recommendations are based on the context of a user. The context of a user is perceived here to govern the behaviour of a user and therefore to affect their likely preferences for engaging with content. The likely context based preferences for a user can be determined by monitoring historical behaviour of a user, or can default to certain conditions based on information about the user, for example, in the user profile. A user can set or override context parameters associated with the context engine module 24 should they wish to do so. The context engine module 24 also influences the recommendation engine to define the number and type of assets to be recommended to a user, based on context.

The user device 4 executes a client application 38 which cooperates with the context engine 24 to deliver context based recommendation.

The content delivery system is capable of compiling video snippets based on various context parameters including: location, time (possibly short-form in the day and long-form in the evening), device (flat screen TV, laptop, mobile device), available time (that is, the time available to a user to engage with particular content. The terms short-form and long-form define different types of assets—other types of content include news articles, linear news, social content. As mentioned above, different types of assets can be stored in the asset server 6, or available from the multiple sources 14 to 22. In addition, other assets can be available from different sources (not shown), for example, static news articles. Herein, the term "content" refers to any type of displayed images or text to a user; a content item is a piece of content. The term "asset" is used herein to denote video assets and also other types of content items without limitation.

The content, type and number of the recommended assets/content items varies with context, and is based on updates from at least one social media feed sharing characteristics with the consumer.

Figure 2:
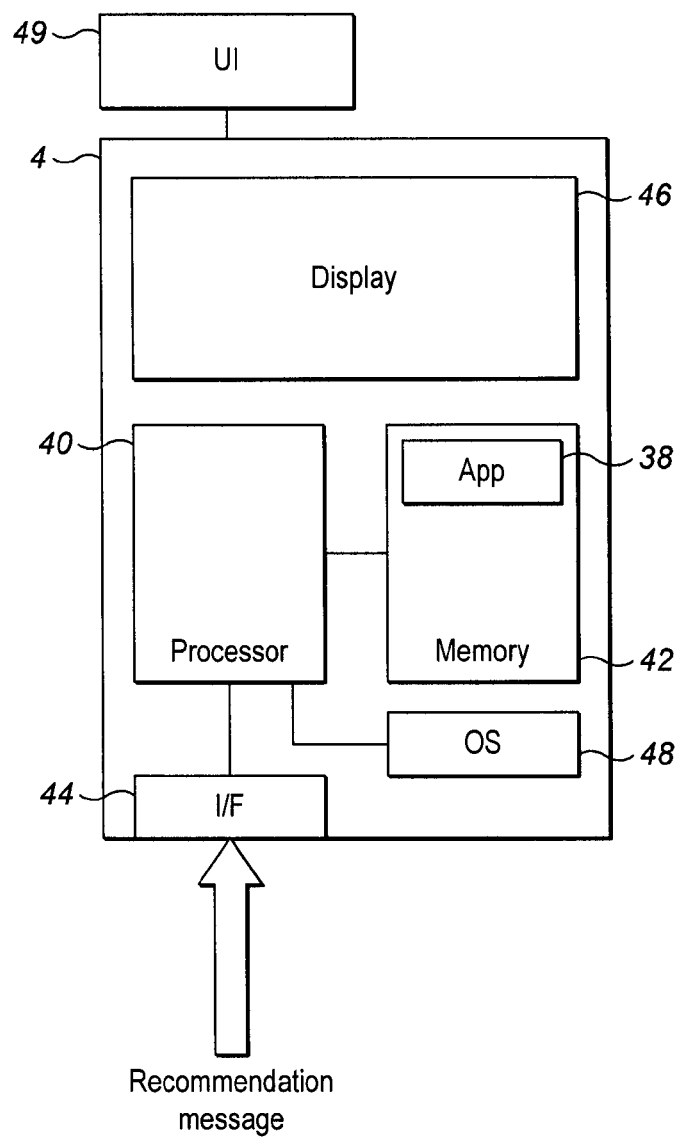
FIG. 2 is a schematic diagram of a user terminal.

FIG. 2 is a schematic block diagram of a user terminal 4. The user terminal 4 comprises a processor 40 and a memory 42. The client application 38 is stored in the memory 42 and is executed by the processor 40. The user terminal 4 also has an interface 44 and a display 46. The display is controlled by the processor 40. As will be evident from the following, instructions received from the server in a recommendation message by the interface 44 are used by the processor to control the display 46. Although one processor is shown, it will be evident that the display could in fact be controlled by a dedicated graphics card or dedicated driver responsive to the instructions received from the server. The user terminal 4 has its own operating system 48. When delivering content of different types to a display 46 of a known computer device, such as a smartphone or tablet, it is the operating system which is generally responsible for aggregating different types of content and driving the display to display those different types of content. In the present system however it is the app which is executed by the processor 40 and which is responsive to instructions in the recommendation message from the server which controls the display and allows the display to show different types of assets. Thus, the application can be delivered to different kinds of devices running different kinds of operating systems (for example, android, IOS, etc.). Thus, a similar experience can be delivered to users even if they are using different device types. Moreover, it is the server itself which manages the layout of the display for a particular device and the content recommendations for a particular user, so that the particular OS which is being executed by the device to support the basic operations of the device does not affect the system. Moreover, the server can deliver a recommendation message to any user terminal executing the app 38 regardless of its operating system.

The implementation and operation of the asset list controller is now more particularly described with reference to a preferred embodiment.

Figures 3, 4:
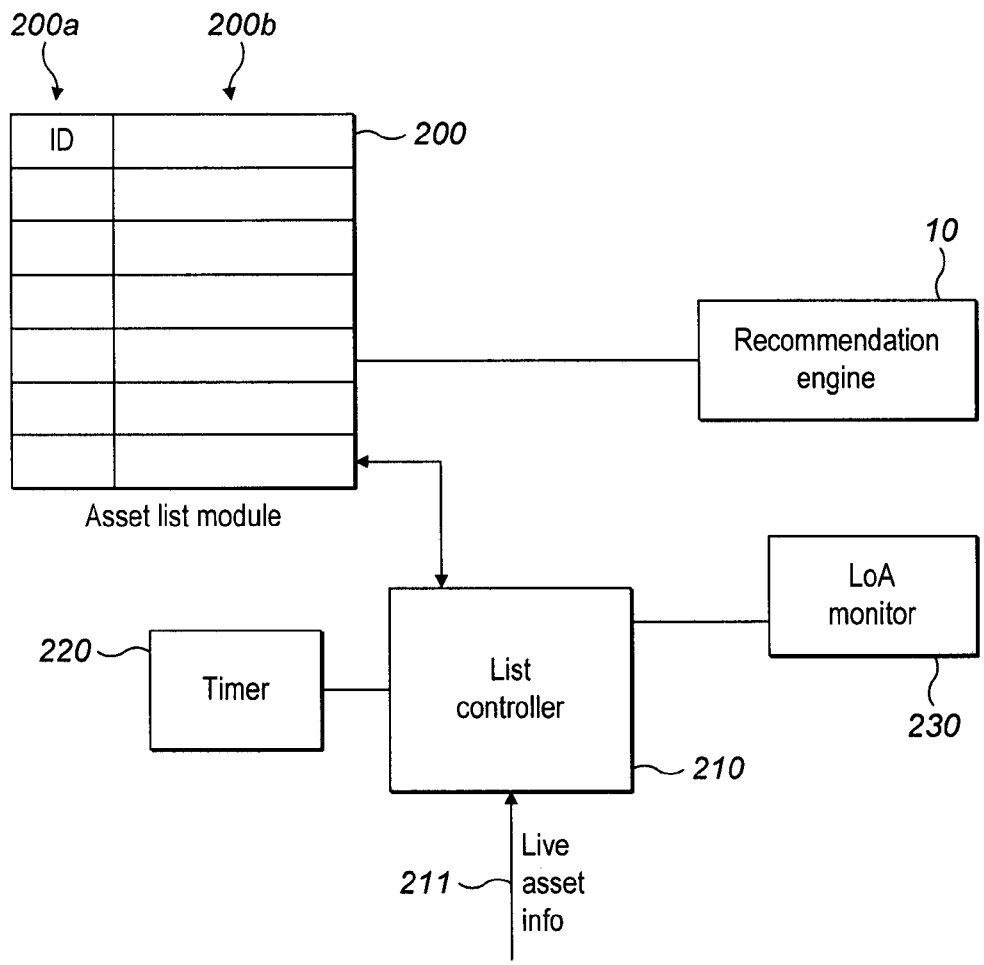
FIG. 3 which shows components of an asset list control system.
FIG. 4 which shows a piece of asset data.

FIG. 3 illustrates components of a content delivery system which handles "staleness". The content delivery system includes: an asset list module 200; a recommendation engine 10; a timer 220; a list controller 210; and a level of activity (LoA) monitor module 230.

The asset list module 200 contains an asset list which comprises asset identifiers, each of which identifies an asset. As shown in FIG. 3 the asset list module comprise an asset list having a first column 200a comprising asset identifiers, and a second column 200b comprising asset metadata, each row comprising an asset identifier and its associated metadata.

The superset of metadata a typical recommendation system would require is the title, author/by-line, first paragraph, keywords, originating site, genre, clip length, cast/crew/players/speakers/etc of the asset.

The new asset data needed here is whether the asset is perishable or not and if so its likely life span. Referring to FIG. 4, an example is shown. The meta data 300 of the asset comprises: an asset ID field 302a; a perishable flag field 302b, a known or estimated field 302c, a freshness period field 302d, an asset information field 302e, and an LoA threshold field.

The asset ID field identifies the asset. The asset information field 302e comprises the superset of metadata for the asset as referred to above. The perishable flag field 302b, the known or estimated field 302c, and the freshness period field 302d are provided in accordance with this described embodiment.

The perishable flag field 302b is set or not set to indicate whether an asset is a perishable asset or not. Thus this field simply indicates whether the asset is perishable or not.

If the asset is not perishable, then the fields 302c and 302d will be empty. These fields are provided to give additional information for a perishable asset.

The known or estimate field 302c is set to indicated whether a period of freshness is fixed or estimated. This may be a simple flag.

The freshness period field 302c provides an indication of the time at which the perishable asset is known to become stale fresh or estimated to become stale. Each perishable item is associated with a freshness period, measured from the time of creation of the asset to a point at which the asset should be considered no longer to be fresh (i.e. stale). The freshness period may be known at the time of the ingest into the system or it may be estimated. Where it is estimated, then the point at which the asset is no longer fresh is when the level of activity associated with it drops below a given threshold—level of activity is discussed further below.

The freshness period field 302d thus provides a length of time for which the asset is fresh.

The asset information filed 302e includes information about the asset, and includes the time at which the asset was created so that the system can calculate when the moment of expiry should be.

The LoA threshold field 302f provides the information which is used in relation to level of activity, as discussed below. The LoA threshold is used when the asset perishability has been estimated, as discussed below.

It should be understood that FIG. 4 illustrates an example.

Returning to FIG. 3, the recommendation engine 10 has access to the asset list module 200 containing the asset list. Although the asset list is illustrated in FIG. 3 as being provided in a dedicated asset list module 200, in implementations the asset list could be included in the server or could be provided to be remotely available to the recommendation engine 10.

In FIG. 3 the list controller 210 is shown external to the recommendation engine 10, although in implementations it could form a part of the recommendation engine 10. The list controller 210 is responsible for adding and removing assets to and from the asset list of the asset module 200. The asset list is stored in an electronic memory and removal of an asset has the effect of deleting it from the memory or at least rendering it unaccessible such that as far as the recommendation engine is concerned, the asset is not available for recommendation.

The list controller 210 receives information about assets on an input communication line 211. The inputs on communication line 211 could come directly from the content sources 14 to 22 of FIG. 1, or from the data aggregator 12. The list controller 210 does not have to receive the assets themselves, but only needs to receive an identifier of the asset and the time at which the asset was generated. The list controller 210 can derive this information from assets that it receives, or it can just receive this information which has itself been derived from the assets. The list controller 210 is associated with the timer 220 to keep track of the various time periods needed to control the asset list.

The list controller simply processes the asset metadata as provided. It does not decide if an asset is to be treated as perishable, as this information is already part of the input and will have been defined by an editor or the evaluation of rules operating elsewhere (e.g. an adapter that ingests goal clips from football matches will mark each such clip as perishable with a freshness period of, for example, 1 hour). The list controller performs no relevance calculations, this being a task carried out by the recommendation engine when recommendations are requested.

A first time period is the time which has elapsed from the time of generation of a live asset and the time at which it is available to be consumed by a user and placed onto the asset list. If the asset is not available to be consumed by a user within a certain time, it is not placed on the asset list at all.

The list controller keeps track of the time at which an asset was placed on the asset list and monitors the time period. After a certain time period has elapsed, an asset is removed from the asset list, based on the asset data. For example, a news article which has asset data defining that it is perishable with a fixed period may be removed from the asset list after that fixed period, e.g. only minutes or hours, whereas a broadcast programme may remain on the asset list for a week and then be removed. In alternative arrangements, rather than being removed an asset may have its weighting changed on expiry of the fixed period.

The level of activity monitor 230 monitors the level of activity associated with assets of uncertain freshness periods as described above.

Figure 5:
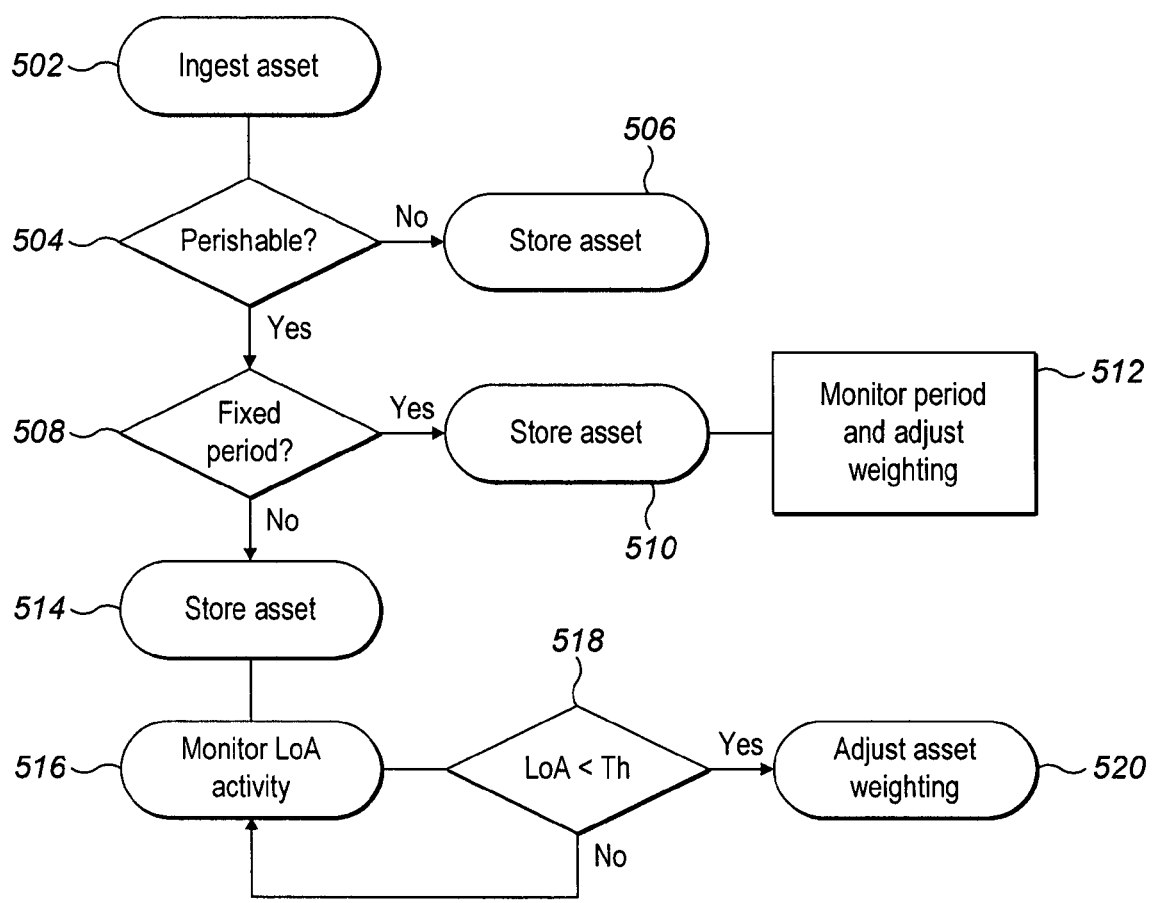
FIG. 5 which is a flow chart, showing a method of operation of the asset list controller.

FIG. 5 is a flow chart showing a method of operation of the asset list controller, with reference to which the preferred embodiment is now further described.

In a step 502, an asset is ingested by a content delivery system.

In a step 504 it is determined whether the asset is perishable. This determination is made by the list controller 210. The list controller examines the meta data packet for the asset, and determines whether the perishable flag in field 302$b$ is set.

If the perishable flag in field 302$b$ is not set, then in step 506 the list controller simply stores the asset metadata, and updates the asset list module to include the asset identifier and asset metadata in step 506.

If the perishable flag in field 302$b$ is set, then in step 508 the list controller 210 determines if there is a fixed period associated with the perishability of the asset. This is determined by examining the known or estimated field 302$c$ or the freshness period field 302$d$ in the meta data packet for the asset.

If either the known or estimated field 302$c$ or the freshness period in field 302$d$ in the meta data packet for the asset is set, the list controller stores the asset metadata, and updates the asset list module 200 to include the asset identifier and asset metadata in step 510.

Thereafter in a step 512 the list controller 210 monitors the period associated with field 302$c$ or 302$d$.

If a value is set in the known or estimated filed 302$c$, then the list controller 210 may remove the asset from the asset list when the known or estimated time is reached. However, the list controller may alternatively adjust a weighting associated with the asset when the known or estimated time is reached, rather than simply deleting the asset. Each asset in the asset list may be associated with a weighting, which weighting is taken into account in compiling recommendations. For a perishable asset, while the asset is fresh, the weighting may be high. When the asset freshness expires, and it becomes stale, the weighting of the asset may be reduced rather than the asset being deleted. The weighting may continue to be reduced over time.

If a value is set in the freshness period filed 302$d$, then the list controller 210 will similarly remove or adjust the weighting of the asset from the asset list when the appropriate time period has elapsed.

If neither the known or estimated field 302$c$ or the freshness period in field 302$d$ in the meta data packet for the asset is set, the list controller simply stores the asset metadata in step 514.

For all stored perishable assets in the asset list of the asset list module 200, thereafter in a step 516 the level of activity associated with the asset is monitored by the LoA monitor 230.

In embodiments a threshold is set as being a level of activity below which the asset should be removed or having an associated weighting reduced, and above which the asset should be retained without its weighting being adjusted. This threshold may be a fixed value for all assets, or may be fixed for certain types of assets, or may be set for an individual asset. The threshold for the level of activity, where required, would be provided with the asset metadata at the time of ingest. These thresholds are typically set by the provider of the metadata.

When the level of activity is monitored in step 516, then in step 518 the determined level of activity is compared with the threshold set for that asset. If the level of activity is above the threshold, then the level of activity is continued to be monitored in step 516.

If the level of activity is below the threshold, then in step 520 the asset is removed from the asset list, or its associated weighting is reduced, by the asset controller.

The monitoring may be set so that the comparison of the level of activity to the threshold is only carried out a predetermined time after the asset has been included in the asset list. The comparison to the threshold takes place over time, and it may be determined that the level of activity is below a threshold based on the activity other a particular time period.

The monitoring of a level of activity may take place for all perishable assets or only some perishable assets.

Assets which are associated with a fixed time period in step 508 may further be monitored for level of activity.

Where the level of activity of perishable assets having a fixed time period is monitored, an asset may be removed or have its weighting reduced from the asset list prior to the time period which is being monitored in step 512, i.e. before the period defined in fields 302$c$ or 302$d$, if a low level of activity is detected.

Conversely, for an asset for which its freshness time period has expired, but is retained in the asset list with reduced weighting, its weighting may be increased if the detected level of activity for the asset increases above a threshold.

The level of activity may be associated with different thresholds for detecting a low level of activity and a high level of activity for an asset, and may have multiple thresholds associated with the allocation of different weightings.

Embodiments have been described by way of reference to various examples to help in understanding. Embodiments are not limited to the detail of any example unless such detail is presented as essential by inclusion in an independent claim. All details of all embodiments may be combined either selectively or as a whole, and any embodiment does not exclude any combination nor is any embodiment limited to any combination unless such combination is presented as essential by inclusion in an independent claim.

Embodiments may be implemented in an apparatus, a method, or computer program code.

The apparatus may be a user device, or a server to which a user device is connected, or a system comprising a user device and a server. Each apparatus may include, at least, a processor and a memory and generally be implemented in a user device, or a server to which a user device is connected, or both a user device and a server.

The method may be a computer program. A computer program may be a computer program or executable code which, when run or executed on an apparatus, performs the method. The computer program or executable code may be run on the user device, or the server, or both the user device and the server.

The computer program may be stored on a memory, and may be stored across multiple memories. The memory may be a memory of a functional device, or may be a specific memory storage apparatus such as a memory disk or memory stick. The memory may be a memory available on a network, such as a memory area available in a network such as an area of a so-called 'cloud'.

Aspects of the embodiments described herein include any or all of the described features used in any combination. In addition, methods, and computer programs for implementing the method, are contemplated.

The invention claimed is:

1. A computer device for providing recommendations to a user device associated with a user, the computer device comprising:
    an asset list module configured to store an asset list in a memory of the computer device, the asset list comprising asset identifiers and asset metadata for a plurality of perishable assets;
    a recommendation engine implemented by a processor, the recommendation engine configured to access the asset list and to generate recommendations;
    the recommendation engine including a controller for maintaining the asset list, wherein the controller is further configured to:
        receive notification of a new asset;
        determine if the new asset is perishable;
        in dependence on the new asset being perishable, update the asset list to include the new perishable asset;
        allocate a weighting to the new perishable asset; and
        adjust the weighting of the perishable assets in the asset list based on the respective perishability of each perishable asset over time,
    wherein the recommendation engine is configured to generate the recommendation dependent on the weightings allocated to the respective perishable assets and provide the recommendation to the user device,
    the computer device further comprising a level of activity monitor wherein a level of activity associated with at least one perishable asset is monitored and the controller is configured to adjust the weighting of the perishable asset in dependence on the monitored level of activity,
    wherein the controller is configured to decrease the weighting in dependence of the level of activity being below a threshold, and
    wherein the controller is configured to increase the weighting in dependence on the level of activity being above a threshold.

2. The computer device of claim 1 further comprising a timer, wherein at least one perishable asset is associated with a time period identified in its metadata, wherein the weighting of the at least one perishable asset is adjusted on expiry of the time period as denoted by the timer.

3. The computer device of claim 2 wherein on expiry of the time period as denoted by the timer, the controller is configured to decrease the weighting of the perishable asset or remove the perishable asset from the asset list.

4. The computer device of claim 1 wherein the controller is configured to remove the perishable asset from the asset list if the level of activity is below a threshold.

5. A recommendation system including the computer device of claim 1.

6. The computer device of claim 1 wherein the metadata for a perishable asset includes one or more of: a freshness period field providing an indication of the time at which the perishable asset is known to become stale, wherein the freshness period is known or estimated; a time at which the asset was created; and a level of activity threshold for the asset.

7. The computer device of claim 6 wherein if the freshness period field is estimated, the point at which the asset is no longer fresh is when the level of activity associated with it drops below the threshold.

8. A method for providing recommendations to a user device associated with a user, the method comprising:
    storing an asset list comprising asset identifiers and asset metadata for a plurality of perishable assets;
    maintaining the asset list;
    accessing the asset list to generate recommendations;
    receiving notification of a new asset;
    determining if the new asset is perishable and, in dependence on the new asset being perishable updating the asset list to include the new perishable asset;
    allocating a weighting to the new perishable asset;
    adjusting the weighting of the perishable assets in the asset list based on the perishability of each perishable asset over time;
    generating the recommendations in dependence on the weighting allocated to the respective perishable assets and delivering them to the user device;
    monitoring a level of activity associated with at least one perishable asset and
    adjusting the weighting of the perishable asset in dependence on the monitored level of activity, wherein the weighting is decreased in dependence of the level of activity being below a threshold, and the weighting is increased in dependence on the level of activity being above a threshold.

9. The method of claim 8 wherein the perishable asset is associated with a time period, the method further comprising:
    adjusting the weighting of the perishable asset on expiry of the time period.

10. The method of claim 9, further comprising:
decreasing the weighting on expiry of the time period.

11. The method of claim 9, further comprising:
removing the perishable asset from the asset list on expiry of the time period.

12. The method of claim 8, further comprising:
removing the perishable asset from the asset list if the level of activity is below a threshold.

13. A non-transitory computer-readable medium on which there is provided a computer program adapted to perform the method of claim 8.

14. A non-transitory computer-readable medium on which there is provided a computer program product for storing computer program code which, when executed on a computer, performs the steps of claim 8.

* * * * *